March 8, 1938. W. TYDON ET AL 2,110,749
LANDING GEAR LOCKING DEVICE
Filed Oct. 27, 1936 3 Sheets-Sheet 1
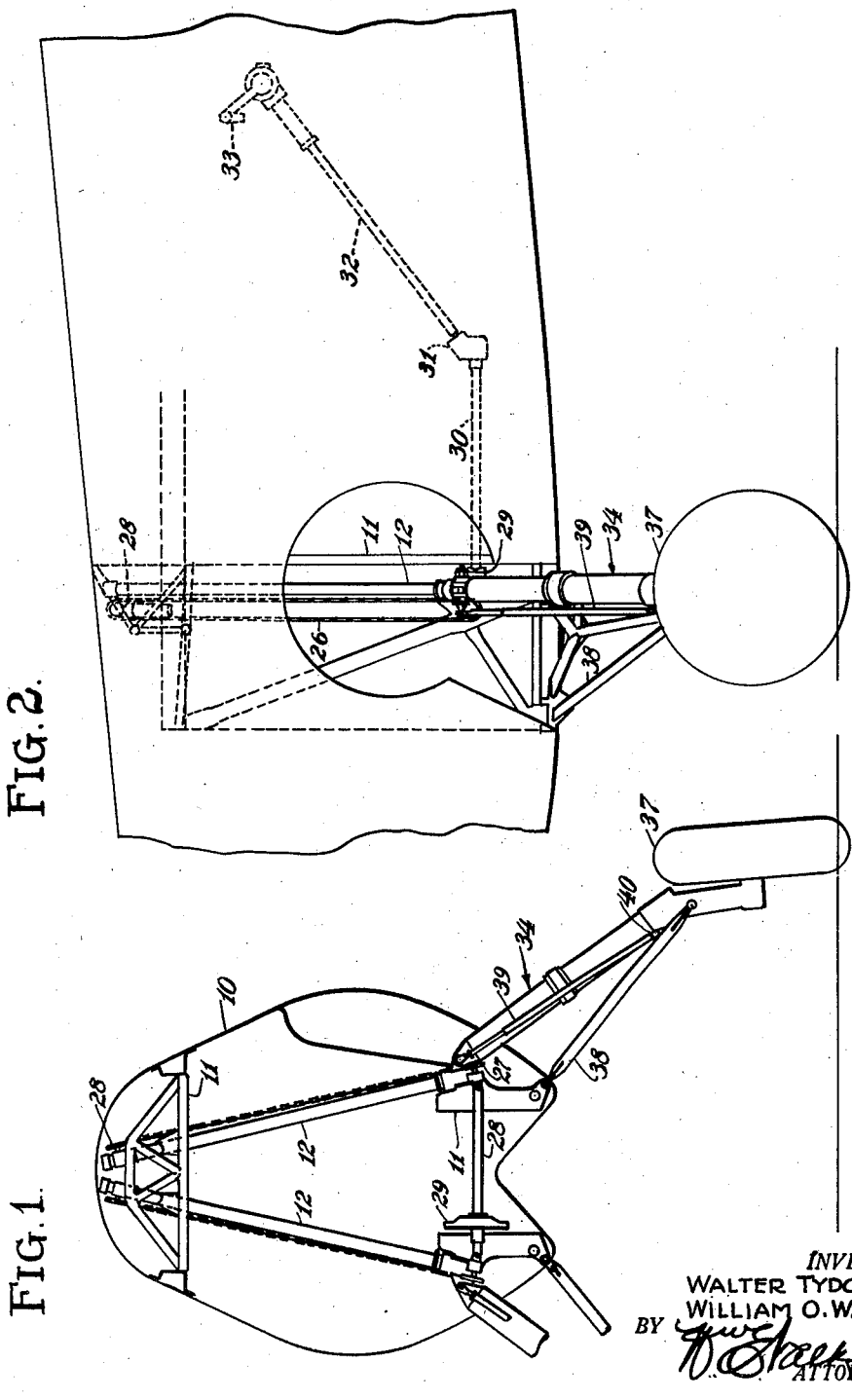
INVENTORS.
WALTER TYDON and
WILLIAM O. WATSON.
BY
ATTORNEY.

March 8, 1938.　　　W. TYDON ET AL　　　2,110,749
LANDING GEAR LOCKING DEVICE
Filed Oct. 27, 1936　　　3 Sheets-Sheet 2
FIG.3.
FIG.4.
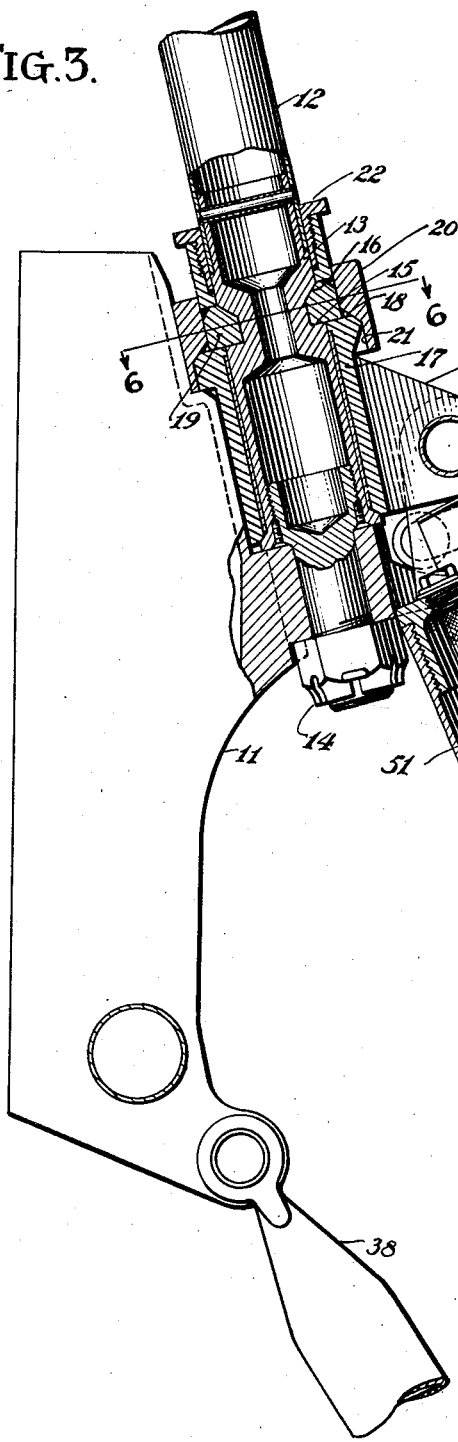
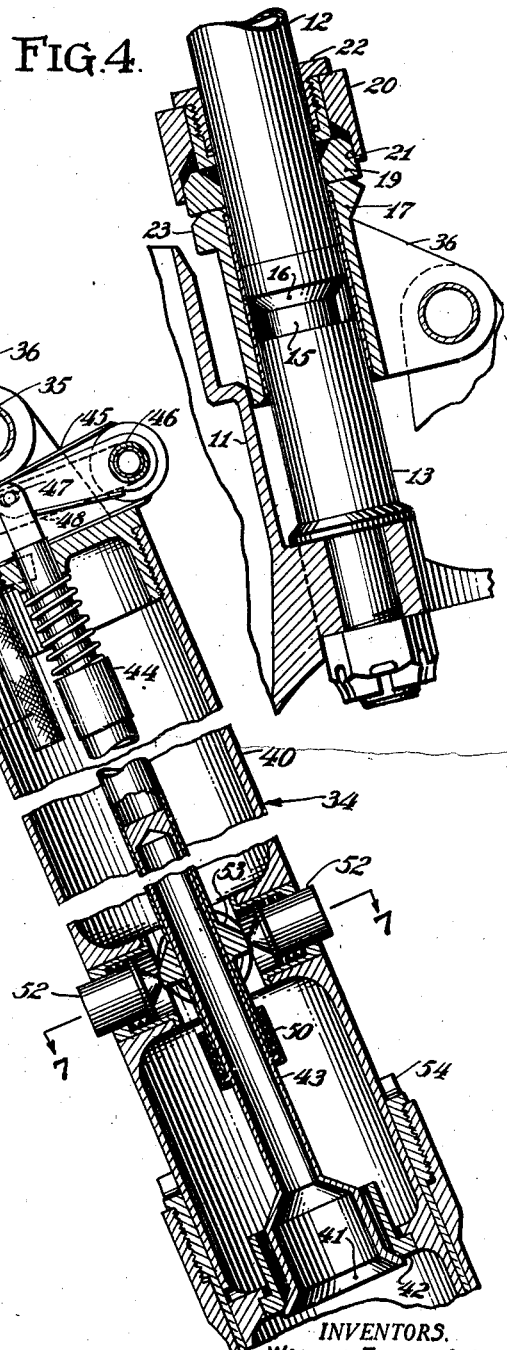
INVENTORS.
WALTER TYDON and
WILLIAM O. WATSON.
BY
ATTORNEY.

March 8, 1938. W. TYDON ET AL 2,110,749
LANDING GEAR LOCKING DEVICE
Filed Oct. 27, 1936 3 Sheets-Sheet 3
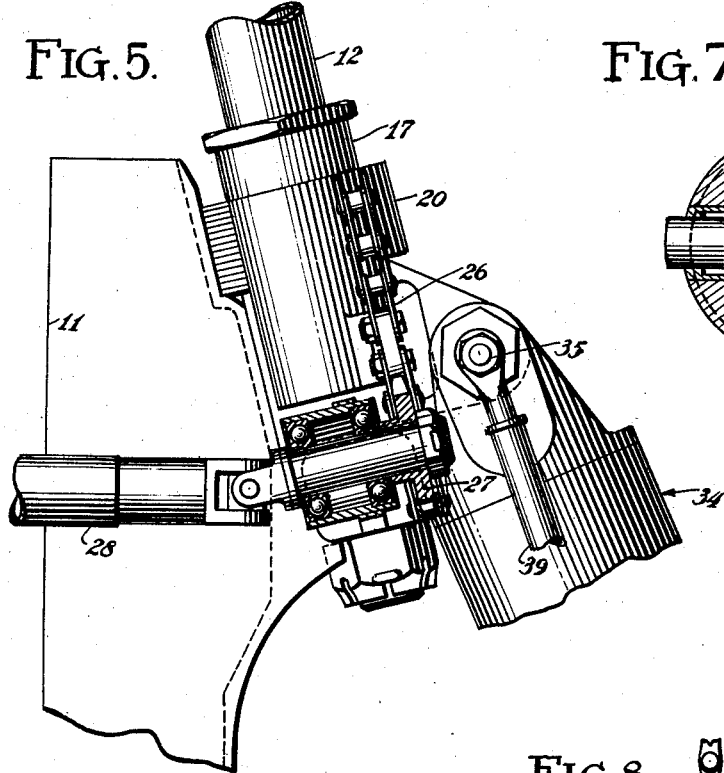
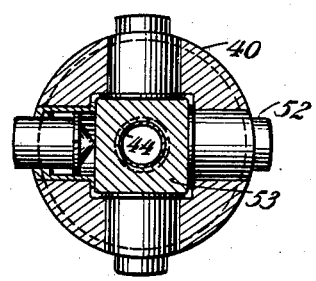
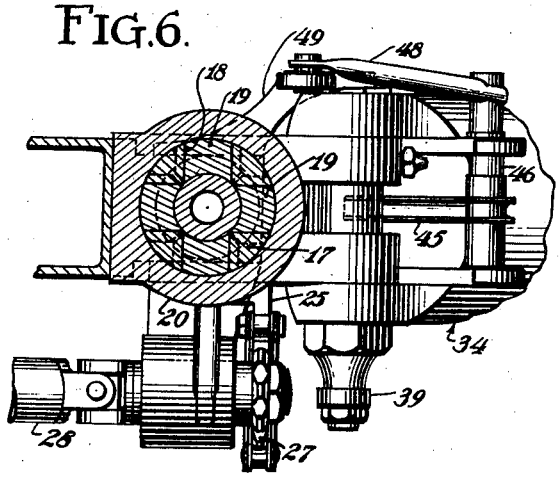
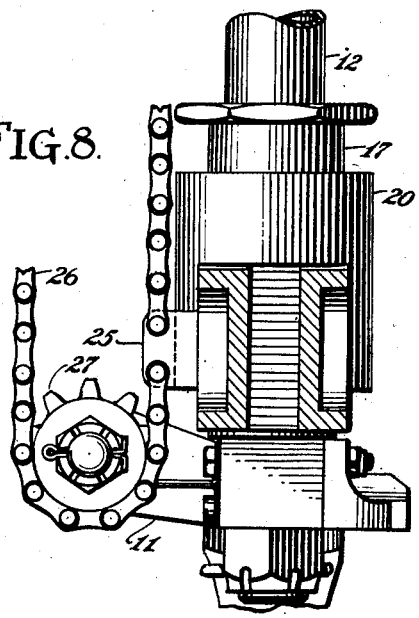
INVENTORS.
WALTER TYDON and
WILLIAM O. WATSON.
BY
ATTORNEY.

Patented Mar. 8, 1938

2,110,749

UNITED STATES PATENT OFFICE 2,110,749

LANDING GEAR LOCKING DEVICE

Walter Tydon, Buffalo, and William O. Watson, Kenmore, N. Y., assignors to Curtiss-Wright Corporation, a corporation of New York Application October 27, 1936, Serial No. 107,764

5 Claims. (Cl. 244—102)

This invention relates to retractable landing gears for aircraft and comprises essentially, improvements on the landing gear shown in a copending patent application, Serial No. 674,812, filed June 8, 1933.

The landing gear of said application, as in the present invention, comprises struts so organized as to move a landing wheel from a position below the aircraft body, laterally and inwardly to a nested position in a recess in the side of the aircraft body. In said prior application the retracting mechanism comprised a turnable screw shaft adapted to translate a carrier member to which certain of the struts were pivoted.

The present invention contemplates improvements whereby landing gear extension and retraction may be more rapidly effected, and whereby locking of the landing gear in its extended position is made positive. A further object of the invention involves a factor of making the landing gear retracting mechanism lighter in weight.

Additional objects of the invention comprise the provision of an automatic locking organization for retractable landing gears, locking and unlocking of the landing gear at its extended position being effected by the final and initial movement respectively of the operating means and the retractable landing gear.

A further object of the invention comprises improvements in means for shortening the shock absorber strut of a retractable landing gear whereby it may occupy a substantially reduced space when retracted, as compared with the space occupied thereby when the landing gear is in its extended position.

Further objects of the invention will become apparent in reading the annexed details of the description and claims, and in viewing the drawings, in which:

Fig. 1 is a front elevation of a section through the fuselage of an aircraft showing the landing gear in extended position, Fig. 2 is a side elevation of the fuselage and landing gear, Fig. 3 is an enlarged section through part of the landing gear including the locking mechanism and a part of the shock absorber strut, Fig. 4 is a section through the locking mechanism in a different position of adjustment, Fig. 5 is a view generally similar to that of Fig. 4 showing a portion of the landing gear operating means, Figs. 6 and 7 are sections respectively on the lines 6—6 and 7—7 of Fig. 3 and Fig. 8 is a side elevation of part of the landing gear operating means and locking mechanism.

Referring in detail to the drawings, a fuselage 10 is provided with structural elements 11 which fixedly carry guide tubes 12, one on each side of the fuselage plane of symmetry. Each tube 12 extends substantially vertically in the fuselage, the lower ends of the tubes 12 being anchored to fittings 13, the lower end of each of which is fixed to the structure 11 by nuts 14. Hereafter only one side of the landing gear will be described, as the two halves are similar. The fitting 13 is cylindrical in form and is provided with an annular groove 15, the upper surface of which is slanted as at 16. Around the tube 12 and fitting 13 is a cylindrical slide 17, organized to slide readily throughout the length of the tube 12 and the fitting 13. This slide is provided with a plurality of radial openings 18 within each of which is fitted a segmental locking block 19, the blocks being capable of radial movement in the slots 18. A collar 20 is fitted around the slide 17 for axial movement with respect thereto, said collar having a bore 21 of such diameter as to accommodate therewithin the blocks 19 when the inner faces of the blocks are resting upon the exterior surface of the tube 12 or fitting 13.

The slide 17 is provided with stops 22 and 23 to limit the axial movement of the collar 20 relative thereto. The above described organization comprises the locking means to permit or to prevent axial movement of the slide 17 with respect to the tube 12 or fitting 13. In operation, the force for translating the unit comprising the elements 17, 19 and 20 is applied to the collar 20. For instance, referring to Fig. 3, if an upward force is applied to the collar 20, the collar moves upwardly until the upper end thereof comes into contact with the stop 22. The collar uncovers the locking blocks 19, and by the camming action of the slanted groove 16, the blocks are forced radially outward disengaging the groove 15 and occupying the space within the bore 21, as shown in Fig. 4.

Further application of the upward force moves the whole assembly along the tube 12.

Conversely, when it is desired to lower the landing gear, a downward force is applied to the collar 20 which bears upon the blocks 19. Since these are constrained from relative movement by the engagement of their inner faces with the tube 12, the slide 17 is forced downwardly until the slots 18 register opposite the groove 15. Thereupon, the collar 20, as it is forced downwardly, urges the blocks 19 into engagement with the groove 15 to lock the slide 17 from axial movement along the fitting 13, thereby positively holding the slide from displacement.

Referring to Figs. 5, 6 and 8, it will be noted that the collar 20 is provided with an extension 25 to which the ends of a chain 26 are pinned. The chain 26 runs over sprockets 27 and 28 shown adjacent the upper and lower ends respectively of the tube 12, the sprocket 27 being driven by a shaft 28 suitably connected through a gear box 29 to a shaft 30, thence through a gear box 31 and a shaft 32 to an operating crank 33 convenient to the aircraft crew.

It will be appreciated that operation of the crank 33 simultaneously operates both sides of the landing gear. The landing gear itself comprises a shock absorber strut 34 hinged at its upper end, at 35, to an ear 36 integral with the slide 17. The lower end of the strut 34 carries a wheel 37, and a strut 38 is hinged at its respective ends to the fuselage structure 11 and to the lower part of the strut 34. A member 39 is hinged at its upper end to the pivot 35 and at its lower end to an intermediate portion of the strut 38, as at 40, so that when the slide 17 is raised, the strut 34 is forcibly compressed to a shorter over-all length, whereby it may more readily be wholly contained within the fuselage 10 when the landing gear is retracted.

The strut 34 is preferably of the oleo-pneumatic type, and means are provided to relieve the air pressure from the strut when retraction of the landing gear is initiated. Likewise automatically operated means are provided to lock the strut, when extended, so that the telescoping elements thereof may not be compressed to the full extent necessary for retraction of the landing gear.

The strut construction is clearly shown in Fig. 3, wherein the plunger part 40 thereof is provided with a valve 41 adapted to seat upon a valve seat 42. The valve stem 43 of the valve 41 telescopes within an operating tube 44 which extends through the upper head of the plunger 40. A rocker arm 45 is pivoted at 46 to the plunger 40 and is connected to the element 44 by a pin 47, so that movement of the rocker 45 effects opening or closing of the valve 41. The shaft of the rocker 45 is provided with a lever 48 adapted to come into contact with a stop 49 when the landing gear is fully extended, whereby the rocker 45 is raised and the valve 41 is positively closed. A resilient connection 50 is provided between the valve stem 43 and the tube 44 to assure proper seating of the valve 41. When the landing gear is fully extended with the valve 41 closed, air is entrained below the valve 41 to provide the pneumatic cushion of the shock absorber. When the landing gear is not extended, the valve 41 is open so that the air entrapped within the strut 34 may escape through a vent 51 as the strut 34 is compressed upon landing gear retraction.

We provide radially movable safety bolts 52 in the plunger 40 which are pushed outwardly from the plunger by a cam 53 integral with the valve operating tube 44. These bolts 52, when the valve 41 and the cam 52 move downwardly on initiation of landing gear retraction, move inwardly to permit of substantially complete telescoping of the strut 34. However, with the landing gear extended and the bolts 52 protruding from the plunger 40, the lower cylinder part 54 of the strut 34 will come into abutment with the bolts 52 to prevent undue compression of the strut 34 under landing conditions, or conceivably, under a condition where the weight of the aircraft resting on the landing gear might tend to unduly compress the strut 34.

An advantage gained by the strut construction above described is that the air depended upon in part for cushioning landing shocks is under atmospheric pressure when the landing gear is fully extended. If the aircraft has been on the ground for a substantial length of time, the air entrapped within the strut 34 may gradually leak therefrom, permitting the landing gear to settle to a point where the strut cylinder 54 rests against the bolts 52. This condition will have no detrimental effect so far as the taxiing or take-off maneuvers of the aircraft are concerned, for the cushioning afforded by the pneumatic tires of the landing wheels will be adequate under these conditions. As soon as the aircraft is in flight, and the landing gear retracted, the valve of the strut 34 is open and a new supply of air is entrapped when the landing gear is again extended to properly take care of the shock absorbing requirements when a landing is again made.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. In an aircraft retractable landing gear, a guide member having a groove therearound toward an end thereof, a slide movable along said member having openings therethrough registrable with said groove, a landing gear strut pivoted to said slide, locking blocks fitted in said openings for movement into said groove upon the indicated registry to lock said slide against movement along said guide, a collar mounted on said slide for movement therewith and with respect thereto, said collar having camming means engageable with said blocks to force the latter into said grooves, and means connected with said collar for moving same relative to and with said slide.

2. In an aircraft retractable landing gear, a guide member having a groove therearound toward an end thereof, a slide movable along said member having openings therethrough registrable with said groove, a landing gear strut pivoted to said slide, locking blocks fitted in said openings for movement into said groove upon the indicated registry to lock said slide against movement along said guide, a collar mounted on said slide for movement therewith and with respect thereto, said collar having camming means engageable with said blocks to force the latter into said grooves, and means connected with said collar for moving same relative to and with said slide, said groove and blocks having coacting cam means for effecting their disengagement after unlocking of said collar and upon movement of said slide relative to said guide.

3. In an aircraft retractable landing gear; a guide rod having an annular groove therearound toward an end thereof; a cylindrical slide translatable along the rod, having a plurality of radial openings; radially movable lock blocks occupying said slide openings, said blocks being of such length as to lie externally flush with the exterior surface of said slide when the block inner portions are engaged within said groove; a collar embracing said slide, movable therewith and with respect thereto, said collar in one position being arranged to embrace said blocks and hold same in groove engagement, and in another position to disengage said blocks whereby the blocks may move outward from groove engagement; a landing gear strut movable with said slide; and means connected with said collar for sequentially moving said collar relative to said slide, and then, said collar and slide together.

4. In an aircraft retractable landing gear; a guide rod having an annular groove therearound toward an end thereof; a cylindrical slide translatable along the rod, having a plurality of radial openings; radially movable lock blocks occupying said slide openings, said blocks being of such length as to lie externally flush with the exterior surface of said slide when the block inner portions are engaged within said groove; a collar embracing said slide, movable therewith and with respect thereto, said collar in one position being arranged to embrace said blocks and hold same in groove engagement, and in another position to disengage said blocks whereby the blocks may move outward from groove engagement; a landing gear strut movable with said slide; means connected with said collar for sequentially moving said collar relative to said slide, and then, said collar and slide together; and abutments on said slide limiting the extent of movement of said collar relative thereto.

5. In an aircraft retractable landing gear; a guide rod having an annular groove therearound toward an end thereof; a cylindrical slide translatable along the rod, having a plurality of radial openings; radially movable lock blocks occupying said slide openings, said blocks being of such length as to lie externally flush with the exterior surface of said slide when the block inner portions are engaged within said groove; a collar embracing said slide, movable therewith and with respect thereto, said collar in one position being arranged to embrace said blocks and hold same in groove engagement, and in another position to disengage said blocks whereby the blocks may move outward from groove engagement; a landing gear strut movable with said slide; and means connected with said collar for sequentially moving said collar relative to said slide, and then, said collar and slide together; and camming means associated with said groove, said blocks and said collar for effecting block movement upon relative movement between said slide and guide, and between said slide and collar.

WALTER TYDON.
WILLIAM O. WATSON.